United States Patent [19]
Yount et al.

[11] Patent Number: 5,464,590
[45] Date of Patent: Nov. 7, 1995

[54] REACTOR TRAYS FOR A VERTICAL STAGED POLYCONDENSATION REACTOR

[76] Inventors: Thomas L. Yount, 3208 Nola La.; J. Wesley Adams, 4000 Grey Fox Dr.; Larry C. Windes, 1212 Jerry La., all of Kingsport, Tenn. 37664

[21] Appl. No.: 238,077

[22] Filed: May 2, 1994

[51] Int. Cl.⁶ ............... C08F 2/00; B01D 11/04; F02M 29/04
[52] U.S. Cl. .......... 422/131; 422/132; 422/134; 422/138; 422/258; 202/158; 261/110; 261/114.5
[58] Field of Search .................... 422/131, 132, 422/134, 138, 257, 258; 202/158; 203/DIG. 6; 261/110, 114.1, 114.5

[56] References Cited

U.S. PATENT DOCUMENTS

| | | | |
|---|---|---|---|
| 1,084,554 | 5/1931 | Dubbs | 202/158 X |
| 3,017,950 | 1/1962 | Koshoot | 202/158 |
| 3,359,074 | 12/1967 | Dobo | 422/134 |
| 3,509,203 | 4/1970 | Michaelis et al. | |
| 3,658,484 | 4/1972 | Bright | 202/158 X |
| 3,787,479 | 1/1974 | Oriehl et al. | |
| 3,841,836 | 10/1974 | Lunsford, Jr. et al. | 422/134 |
| 4,196,168 | 4/1980 | Lewis | 422/134 |
| 4,238,426 | 12/1980 | Slobodyanik | 261/114.1 |
| 4,308,107 | 12/1981 | Markfort | 203/23 |
| 4,615,770 | 10/1986 | Govind | 203/25 |
| 5,013,407 | 5/1991 | Nocca et al. | 202/158 |
| 5,091,060 | 2/1992 | Walker et al. | 203/99 |
| 5,230,839 | 7/1993 | Sampath et al. | 261/110 |

FOREIGN PATENT DOCUMENTS 1320769  6/1973  United Kingdom.

*Primary Examiner*—Robert J. Warden
*Assistant Examiner*—Christopher Y. Kim
*Attorney, Agent, or Firm*—John D. Thallemer; John F. Stevens

[57] ABSTRACT

This invention relates to a vertically disposed polymerization reactor having a series of essentially circular tray assemblies; each tray assembly having a central open vapor chimney and a single flow path composed of at least two loops wherein the liquid polymer flow is reversed by means of a substantially semi-circular turnaround wall; each tray having a liquid polymer tray inlet and a liquid polymer tray outlet for conducting a flow of the liquid polymer by means of a hydraulic gradient; each tray assembly being open at the top for escape of vapor from the liquid polymer flow to the central open vapor chimney; and each tray arranged in vertical disposition one above the other.

18 Claims, 3 Drawing Sheets

REACTOR TRAYS FOR A VERTICAL STAGED POLYCONDENSATION REACTOR

FIELD OF THE INVENTION

This invention relates to a vertically disposed polymerization reactor having a series of essentially circular tray assemblies; each tray assembly having a central open vapor chimney and a single flow path composed of at least two loops wherein the liquid polymer flow is reversed by means of a substantially semi-circular turnaround wall; said trays having a liquid polymer tray inlet and a liquid polymer tray outlet for conducting a flow of the liquid polymer by means of a hydraulic gradient; each tray assembly being open at the top for escape of vapor from the liquid polymer flow to the central open vapor chimney; and said trays arranged in vertical disposition one above the other.

BACKGROUND OF THE INVENTION

Tray designs for vertical oriented polymerization reactors usually employ gravity and vertical drop to achieve the desired degree of polymerization without the complexities of mechanical agitation. In such tray designs, the polymeric melt cascades down the inside of the vertical length of the reaction vessel. Baffles or trays are mounted in the vessel to provide retention of the polymer melts, thereby increasing liquid residence time within the reactor and its exposure to the reaction conditions. The liquid residence time is required to allow sufficient time for the polymerization kinetics to keep up with the enhanced byproduct liberation rates achieved by the increase in the liquid-vapor surface area and the enhancement of its renewal.

U.S. Pat. Nos. 4,196,168, 3,841,836, 3,509,203, 3,359,074 and 3,787,479, and Great Britain Pat. No. 1320769 disclose reactors wherein the reacting media flows by hydraulic gradient. U.S. Pat. No. 4,196,168 discloses a vertical polymerization reactor having a series of downwardly sloping rectangular trays for conducting a flow of liquid polymer in a descending path. U.S. Pat. No. 3,841,836 discloses a vertical polycondensation reactor having a series of downwardly sloping adjustable rectangular trays and a means for continuously sensing the viscosity of the polymer. Disadvantages associated with the use of rectangular trays are that polymer distribution uniformity across the width of rectangular trays is difficult to achieve with large trays and that 30% of the reactor vessel's cross-sectional area, as compared to a circular tray, is lost. In contrast, simple cross-flow on a circular tray fit into the vessel will result in large stagnant flow regions on the periphery of the tray outside the direct streamlines from the inlet to the outlet. Liquid polymer in stagnant flow regions tends to overcook, obtain a high viscosity, crosslink and/or degrade.

U.S. Pat. No. 3,509,203 discloses a vertical reactor having a series of horizontal structures in cascade arrangement which contain a plurality of annular passages in each tray for horizontal flow of the liquid polymer therethrough and a connecting tube from the center of each horizontal structure for downward travel of the liquid polymer. Disadvantages associated with the reactor disclosed in U.S. Pat. No. 3,509,203 are that the flow path is too long for high viscosity materials, corners in the flow path are sources of stagnant flow regions, the roof inhibits vapor transmission and adds unnecessarily to the complexity of construction, and the tubes for flow between the trays prevent the free flow of a film which would enhance the liberation of vapor.

U.S. Pat. No. 3,359,074 discloses a vertical polycondensation reactor having a series of circular trays containing substantially equally spaced, chordwise extending slots. The slots are operative to generate the necessary surface renewal within the relatively more viscous fluid medium passing therethrough. Disadvantages associated with the reactor disclosed in U.S. Pat. No. 3,359,074 are that there is no positive hold-up volume on the trays, the residence time is controlled by fluid viscosity and flow rate, and the slots must be sized accurately for a particular liquid rate and liquid physical properties or the tray could flood or completely drain out. In addition, the vapor flow control mechanism is subject to plugging.

U.S. Pat. No. 3,787,479 discloses a vertical reactor having a series of circular trays with transverse baffles creating several approximately rectangular segments. Thus, the trays contain an elongated side-to-side flow path for plug-like flow of the reaction medium from one side of the tray to the other. Disadvantages associated with the reactor disclosed in U.S. Pat. No. 3,787,479 are that corners in the flow path are sources of stagnant flow regions, and the tubes for flow between the trays prevent the formation of a free-flowing film to enhance the liberation of vapor.

Great Britain Pat. No. 1320769 discloses a reactor having substantially horizontal spiral flow channels, open along the top wherein the side walls of the spiral flow channel are constructed as closed flow ducts. Disadvantages associated with the reactor disclosed in Great Britain Pat. No. 1320769 are that the use of horizontal spiral flow channels without reverse turnarounds prevents the equalizing of flow paths and the "inside" track is shorter than the "outside" track. In addition, the use of only one tray greatly limits the available free surface area, and prevents the formation of a free-falling film between trays which enhances the liberation of vapor.

Thus, the above-mentioned references are deficient in that they include either (a) stagnant flow regions caused by material being bypassed by material flowing within a shorter-path streamline, or (b) poor utilization of the circular space within horizontal cross-section of a vertically oriented cylindrical vessel.

In contrast, the reactor of the present invention utilizes a circular tray which efficiently utilizes the cross-sectional area of a cylindrical reactor while providing uniform liquid polymer melt flow path lengths which minimize stagnant flow or dead zone regions. In addition, the reactor of the present invention is able to process high viscosity liquids and provide controlled residence time (liquid volumetric holdup) for the occurrence of chemical reactions. Moreover, the reactor of the present invention is designed to allow vapor traffic to escape each tray and travel to the reactor's vapor outlet along a path external to the path of the polymer flow.

SUMMARY OF THE INVENTION

Accordingly, it is one object of the present invention to provide an apparatus for the production of condensation polymers.

Accordingly, it is another object of the invention to provide a tray design for a vertical, gravity flow-driven polymerization reactor which increases utilization for liquid retention of the space contained within a substantially cylindrical pressure vessel.

Accordingly, it is a further object of the invention to provide a tray design that minimizes stagnant flow regions and increases liquid velocities.

Accordingly, it is also an object of the invention to provide a tray design that uniformly distributes the flow on each tray.

Accordingly, it is also a further object of the invention to provide a tray design which contains channels that reverse the flow of a liquid by approximately 180° in order to obtain similar flow path lengths along the flow streamlines without the presence of stagnant flow regions or eddies.

Accordingly, it is an additional object of the invention to provide a tray design which provides large amounts of vapor-liquid surface area and creates thin liquid films for bubble devolatilization.

These and other objects are accomplished herein by a polymerization reactor having a vertically disposed outer shell, a liquid polymer reactor inlet near the top of the reactor, and a liquid polymer reactor outlet at the bottom of the reactor, comprising a series of essentially circular flat or downward sloping tray assemblies which are fully enclosed within said reactor vessel;

each tray assembly having a central open vapor chimney and a single essentially uniform cross-section flow path enclosed by means of a wall having sufficient height to prevent spillage of the liquid polymer;

said flow path is composed of at least two loops; the liquid polymer flows from one loop to another loop by means of substantially semi-circular turnaround walls wherein the flow of the liquid polymer is reversed;

said trays having a liquid polymer tray inlet and a liquid polymer tray outlet for conducting a flow of the liquid polymer; flow of the liquid polymer is accomplished by means of a hydraulic gradient wherein the height of fluid surface at the liquid polymer tray inlet is greater than the height of fluid surface at the liquid polymer tray outlet; and said tray assemblies extending to said outer shell in vertical disposition one above the other.

BRIEF DESCRIPTION OF THE DRAWINGS

The invention will be more fully understood and further advantages will become apparent when reference is made to the following detailed description of the invention and the accompanying drawings in which.

DESCRIPTION OF THE INVENTION

Figure 1:
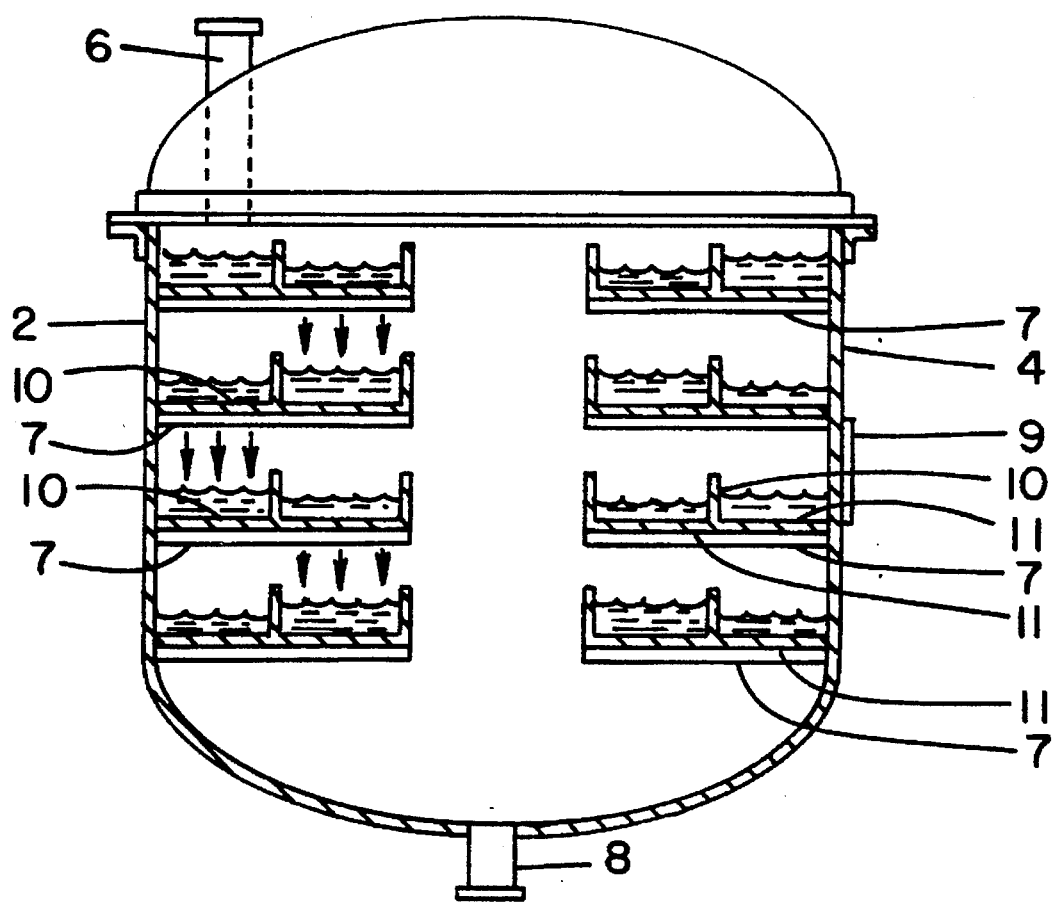
FIG. 1 is a schematic representation of a vertical section of the polymerization reactor.

The present invention relates to a vertically disposed polymerization reactor having a series of essentially circular tray assemblies. In reference to FIG. 1, the polymerization reactor 2 has a vertically disposed shell 4, a liquid polymer reactor inlet 6 near the top of the shell 4 for entrance of a liquid polymer into the reactor 2, a vapor outlet 9, and a liquid polymer reactor outlet 8 at the bottom of the shell 4 for exit of the liquid polymer from the reactor 2.

The improvement in the polymerization reactor 2 is in the series of essentially circular tray assemblies 10 which are fully enclosed within said reactor 2. Enclosure of the outer perimeter of the tray assemblies 10 may be either the shell 4 of the reaction vessel 2 or a separate enclosure wall 12 which prevents liquid polymer from splattering out and over the perimeter of the tray assemblies 10. As set forth in FIG. 2, the tray assemblies 10 have a liquid polymer tray inlet 14 and a liquid polymer tray outlet 16. Each tray assembly 10 has a central open vapor chimney 18 bounded by an inner wall 20.

Liquid polymer flows over a tray floor 11 along a single uniform cross-section flow path 26 enclosed by means of an outer wall 12, an inner wall 20, a middle wall 22 between the outer wall 12 and the inner wall 20, and a semi-circular turnaround wall 24. The walls have sufficient height to prevent spillage of the liquid polymer. The tray floor 11 may be flat or have a downward sloping floor and/or vertical falls. Such features of the tray floor may be adjustable to provide control of the depth of liquid polymer on the tray. Increasing the angle of the downward sloping floor and/or increasing the frequency of vertical falls results in shallow polymer depths which rapidly liberate byproducts.

The cross-sectional flow path 26 is composed of at least two loops, an inner loop 30 and an outer loop 32. The loops may be concentric. The liquid polymer flows from one loop to the other by means of a substantially semi-circular turnaround wall 24 which results in the flow direction of the liquid polymer being reversed.

Preferably, the width 34 of the cross-sectional flow path 26 is decreased by up to 40% by means of a flow restrictor element 36 near the centerpoint of the arc of the semi-circular turnaround wall 24. The flow restrictor element 36 can be an extension of the middle wall 22, a vertical cylinder, such as a circular cylinder, attached to the end of the middle wall 22, or other bluff body having a vertical axis. Optionally, the middle wall 22 can be tapered into the flow restrictor element. More preferably, the width of the cross-sectional flow path 34 is 20% to 30% less than the width of the cross-sectional flow path 26 in the inner loop 30 and outer loop 32. Preferably, the flow restrictor element 36 causes a gradual temporary contraction in the width of the cross-sectional flow path 26 and subsequent gradual expansion to the original width of the cross-sectional flow path 26. Preferably, the flow restrictor element lengthens the section of the middle wall 22 within the region of the semicircular turnaround wall 24 to at least 20% of the length of the outer semicircular turnaround wall 24.

After reversing flow direction, the liquid polymer flows around the inner loop 30 to the tray outlet 16. Prior to the tray outlet 16, preferably, is an outlet weir 40. The polymer flows over and or through the outlet weir 40 which controls the depth of liquid polymer on the tray assembly 10. The liquid polymer flows from upper tray assemblies 10 to lower tray assemblies 10 by means of gravity. The outlet weir 40 is of such length that as the liquid polymer flows over or through the outlet weir 40, the liquid polymer is sheared into a thin film.

The thinning process shears small bubbles of vaporized byproducts and releases that portion of the byproducts trapped in bubbles which would otherwise be too small to break free of the viscous liquid polymer. Preferably, the polymer flows from one tray to the tray below as a free falling film which enhances the liberation of vapor. The liberation of byproducts which are removed as vapor is necessary in the polycondensation process in order to drive the molecular build up of the polymer.

Flow of the liquid polymer is accomplished by means of a hydraulic gradient wherein the height of fluid surface at the liquid polymer tray inlet 14 is greater than the height of fluid surface at the outlet weir 40. The high velocity of the liquid polymer, compared with rectangular single-pass trays, washes the flow channel which minimizes buildup of polymer on the channel walls and reduces the potential for stagnant flow regions or eddies. In addition, the high velocity improves heat transfer effectiveness which decreases resistance to the transfer of thermal energy and eliminates overcooking of the polymer in localized hot-spots.

The tray assemblies 10 may contain a means for heating liquid monomer or polymer. Heating means 7 include electric resistance, steam, and heat transfer medium chemicals. Preferably, the heating means is uniform and is located on the bottom side of the tray assemblies 10. A preferred heating means is the use of a heat transfer liquid in half pipe jackets which are secured to the bottom side of the tray assemblies 10.

Figure 2:
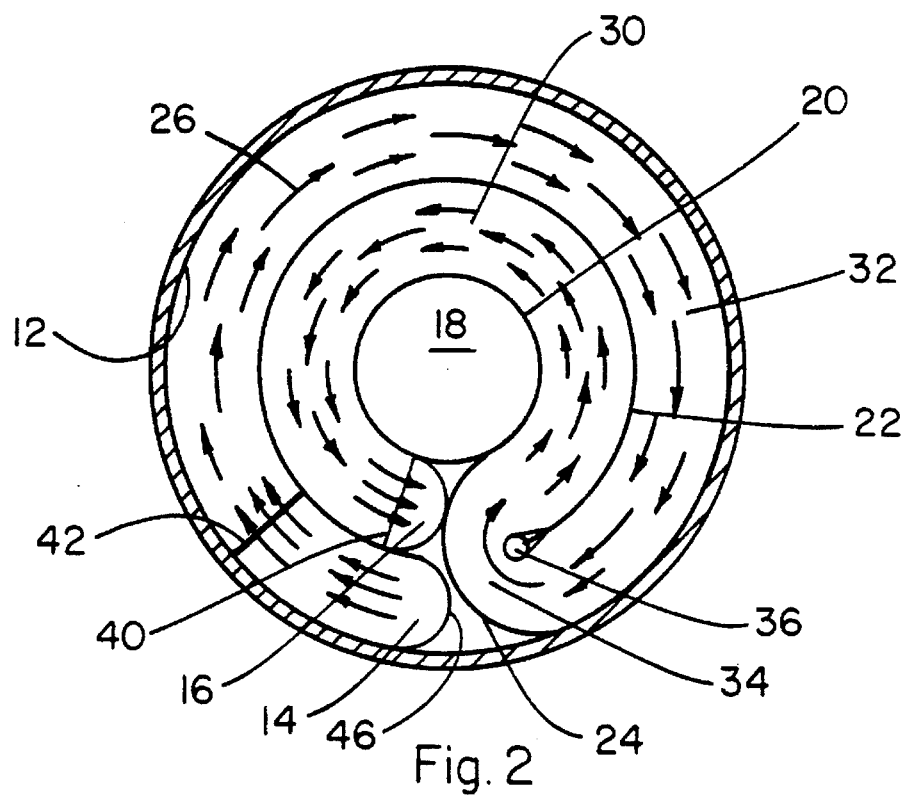
FIG. 2 is a schematic representation of a circular tray. Polymer flow begins on the outside and is indicated by arrows.

The liquid polymer from an upper tray assembly outlet flows into an inlet region of a lower tray assembly. The inlet region is within either the outer loop 32 or the inner loop 30 of the tray assembly 10. In the case where the liquid polymer enters the outer loop 32 through the liquid polymer tray inlet 14, as shown in FIG. 2, the liquid polymer flows in the flow path 26 through a redistribution weir 42 in the outer loop 32. The liquid polymer is prevented from flowing in two directions in the flow path 26 because of a sloping inlet floor having a back wall 46. The liquid polymer flows along the outer loop 32 until the liquid polymer flow is reversed into the inner loop 30 by means of a substantially semi-circular turnaround wall 24. The flow of the liquid polymer in the inner loop 30 is continued until the liquid polymer passes over and/or through an outlet weir 40 into the tray outlet 16 for flow by gravity to a lower tray assembly 10 of the tray immediately below.

Figure 3:
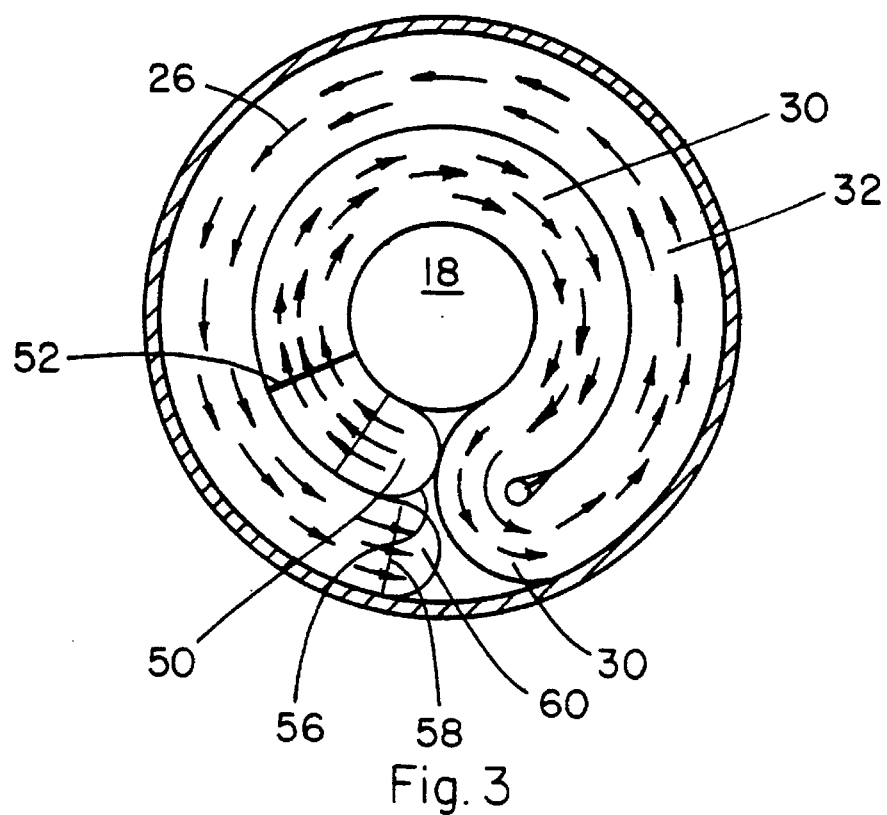
FIG. 3 is a schematic representation of a circular tray. Polymer flow begins on the inside and is indicated by arrows. It is paired with the tray of FIG. 2.

In the case where the liquid polymer enters the inner loop 30 through the tray inlet 50, as shown in FIG. 3, the liquid polymer flows in the flow path 26 through a redistribution weir 52 in the inner loop 30. The liquid polymer is prevented from flowing in two directions in the flow path 26 because of a sloping inlet floor having a back wall 56. The liquid polymer flows along the inner loop 30 until the liquid polymer flow is reversed into the outer loop 32 by means of a substantially semi-circular turnaround wall 24. The flow of the liquid polymer in the outer loop 32 is continued until the liquid polymer passes over and/or through an outlet weir 58 into the tray outlet 60 for flow by gravity to a lower tray assembly 10 of the tray immediately below.

In a preferred embodiment, the flow path of each tray assembly 10 is composed of two loops, an inner loop and outer loop, and all the tray assemblies are essentially identical. In the preferred embodiment, the inner loop extends to the outer wall of the tray assembly, and the inner wall of the inner loop is tangent to the central vapor chimney and to the semicircular turn around wall, and the flow of liquid polymer on each tray assembly 10 proceeds from outside of the tray to the inside of the tray. In each tray assembly 10, the liquid polymer enters the outer loop 32 through the tray inlet 70 and flows through a redistribution weir 74 in the flow path 26. A sloped entry 72 is recommended at the tray inlet 70 to prevent stagnant flow regions in the flow path 26. The orientation of the tray assemblies 10 could be designed in a similar manner so that the liquid polymer flows from the inside of the tray to the outside of the tray, however, this would result in a greater probability of the liquid polymer splashing or spilling into the central vapor chimney 18.

Figure 4:
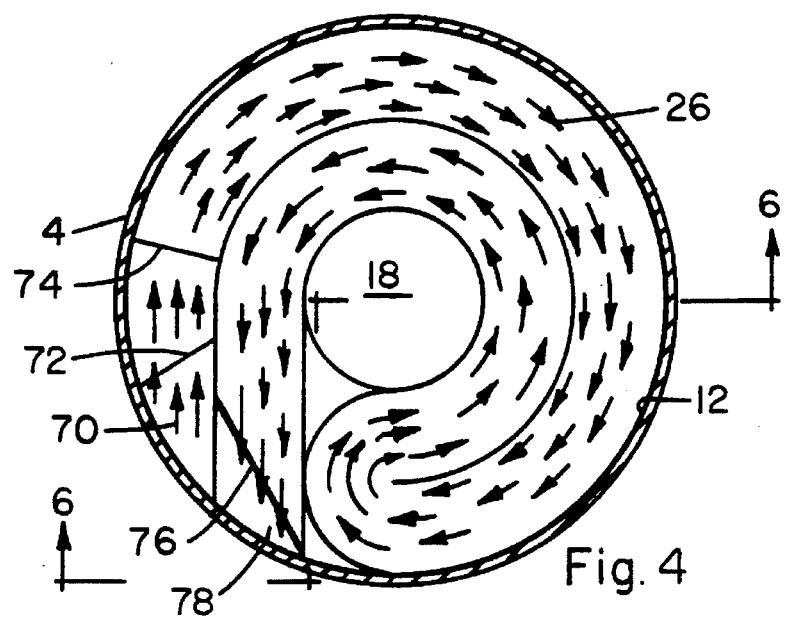
FIG. 4 is a schematic representation of a circular tray. Polymer flow begins on the outside and is indicated by arrows.

Lower tray assemblies are rotated relative to the preceding upper tray assembly. Preferably, a lower tray assembly 10 is rotated 22° to 62° if the central open vapor chimney 18 diameter is one third of the reactor vessel diameter, more preferably 24° to 34° about a vertical axis at the tray centerpoint relative to an upper tray assembly 10. The lower tray assembly is rotated relative to the preceding upper tray assembly in order that liquid polymer flowing over or through the outlet weir 76 of the upper tray outlet 78, falls vertically into the tray inlet 70 of the lower tray assembly, as shown in FIG. 4 and in FIG. 5. The relative angle of rotation between successive trays should be kept to a minimum so that liquid polymer falls into the inlet of a lower tray and stagnant zones opposite the direction of flow on the lower tray are minimized.

Figure 5:
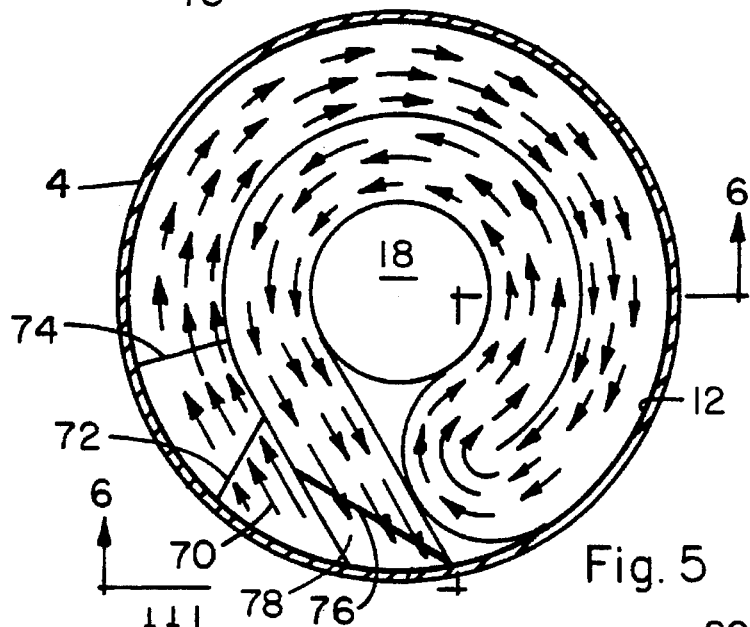
FIG. 5 is a schematic representation of the orientation of successive circular trays of the type shown in FIG. 4.
Figure 6:
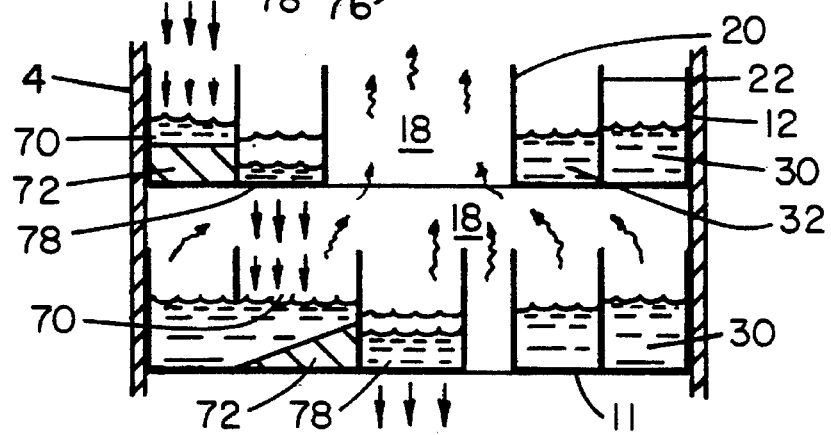
FIG. 6 is a schematic representation of a cross-sectional view of adjacent circular trays. Vapor traffic is indicated by arrows.

As noted in FIG. 4 and in FIG. 5, the outlet weir 76 is enlarged over the previous outlet weir 58 and results in a thinner film falling between trays. The tray outlet weir 76, preferably, is positioned at an angle so that the length over which liquid polymer flows is maximized. The angle of rotation of successive trays is, preferably, approximately equal to the angle of the tray outlet and weir to the direction of flow so that the overflow edge projects parallel to the middle wall of the tray below. More preferably, the angle of rotation and outlet weir angle relative to the direction of flow are 24° to 34°. Preferably, the tray outlet 78 overflow edge is aligned a short distance away from the wall(s) of the lower tray to prevent liquid polymer from flowing down the wall(s).

Each tray assembly 10 may be open at the top for escape of vapor from the liquid polymer over the middle wall 22 and/or inner wall 20 and then radially to the central vapor chimney 18. In contrast, each tray assembly 10 may be closed at the top to force the vapor to move cocurrently to the flow of liquid polymer through the tray outlet 16. The tray assemblies 10 extend to said outer shell 4 in vertical disposition one above the other. In the case where the trays are open at the top, the tray assemblies 10 are far enough apart to allow for vapor to escape and the walls are shallow enough to allow for vapor to escape. The vapor thus escapes along paths that do not interfere with the liquid polymer flow paths. Vapor from the tray assemblies 10 collects in the central open vapor chimney 18 and is channeled along the central open vapor chimney 18 to the vapor outlet 9 of the reactor vessel 2. The central open vapor chimney 18 encompasses 1 to 25 percent, preferably 6 to 12 percent, of the total cross-sectional area of each tray. The exact size of the central open vapor chimney 18 for a specific reactor vessel 2 is dependant on the size of the reactor vessel 2 and the vapor volumetric flow rate. On large reactor columns, the central open vapor chimney 18 can be used to provide access for inspection, cleaning, and modifications.

Variations of the disclosed reactor will suggest themselves to those skilled in this art in light of the above detailed description. All such obvious modifications are within the full intended scope of the appended claims.

What is claimed is:

1. A polymerization reactor having a vertically disposed outer shell, a liquid polymer reactor inlet near the top of the reactor, a liquid polymer reactor outlet near the bottom of the reactor, and a vapor outlet, comprising a plurality of vertically spaced, horizontally disposed, essentially circular tray assemblies which are fully enclosed within said reactor, and which extend to and are circumferentially attached to the outer shell;

each tray assembly having a central open section forming a portion of a common vapor chimney connected to the vapor outlet, with open access to the liquid surface on each tray afforded by vertical spacing between successive trays;

each tray assembly having at least one aperture providing a free passageway to permit the discharge of a downwardly flowing liquid polymer to the tray immediately below;

each tray assembly constructed to facilitate traversal of liquid polymer from tray inlet to tray outlet over the floor of the tray in a single flow channel;

wherein flow of the liquid polymer is accomplished by means of a hydraulic gradient wherein the height of the fluid surface at the tray inlet is greater that the height of the fluid surface at the tray outlet, and the single flow channel is defined by baffle walls having sufficient height to prevent spillage of liquid polymer, said baffle walls forming a channel having at least two curved-loop subsections, wherein the liquid flows between subsections through a channel section defined by a substantially semi-circular turnaround wall wherein the angular direction of the flow of liquid polymer upon the tray is reversed.

2. The reactor of claim 1 wherein the tray assemblies include a heating means.

3. The reactor of claim 2 wherein the heating means is selected from the group consisting of electric resistance, steam, and heat transfer medium chemicals.

4. The reactor of claim 1 wherein the flow path width is gradually decreased at the semi-circular turnaround wall by use of a flow restrictor element, and the flow path width is subsequently increased to its original value.

5. The reactor of claim 1 wherein the flow path width is reduced up to 50% by means of a bluff body flow restrictor near the midpoint of the semi-circular turnaround wall.

6. The reactor of claim 5 wherein the flow path width is reduced 15 to 40 percent at the semi-circular turnaround wall.

7. The reactor of claim 6 wherein the flow path width is reduced 20 to 30 percent at the semi-circular turnaround wall.

8. The reactor of claim 1 wherein the central open vapor chimney comprises 1 to 25 percent of the total cross-sectional area of each tray.

9. The reactor of claim 8 wherein the central open vapor chimney comprises 6 to 12 percent of the total cross-sectional area of each tray.

10. The reactor of claim 1 wherein the inner loop extends to the outer wall of the tray assembly so that the liquid polymer falls from the upper tray outlet to the tray inlet of a lower tray.

11. The reactor of claim 1 wherein the inner wall of the inner loop is tangent to the central vapor chimney and to the semicircular turn around wall.

12. The reactor of claim 1 wherein the flow path of each tray assembly is composed of two loops, an inner loop and outer loop.

13. The reactor of claim 1 wherein a lower tray assembly is rotated relative to an upper tray assembly wherein the angle of rotation is such that the liquid polymer falls into the outermost loop of a lower tray assembly.

14. The reactor of claim 13 wherein the lower tray assembly is rotated 22° to 62° relative to the upper tray assembly.

15. The reactor of claim 14 wherein the lower tray assembly is rotated 24° to 34° relative to the upper tray assembly.

16. The reactor of claim 13 wherein the liquid polymer of the upper tray flows over or through an outlet weir which is perpendicular to the flow of polymer.

17. The reactor of claim 13 wherein the liquid polymer flows over or through an outlet weir which is positioned at an angle of 20° to 60° relative to the flow of polymer.

18. The reactor of claim 17 wherein the outlet weir angle relative to the flow of polymer is 24° to 34°.

* * * * *